United States Patent [19]

Karubian

[11] 4,449,271

[45] May 22, 1984

[54] CARCASS SAW

[76] Inventor: Ralph Karubian, 7100 S. Avalon Blvd., Los Angeles, Calif. 90003

[21] Appl. No.: 432,344

[22] Filed: Oct. 15, 1982

[51] Int. Cl.³ .......................... A22B 5/20; B27B 13/02
[52] U.S. Cl. .......................................... 17/23; 30/380
[58] Field of Search ................ 30/380, 382, 383, 384, 30/385, 274; 17/23; 83/661, 814, 816, 574

[56] References Cited
U.S. PATENT DOCUMENTS

| 3,121,910 | 2/1964 | Wells et al. | 17/23 |
| 4,141,142 | 2/1979 | Karubian | 30/380 |
| 4,212,104 | 7/1980 | Wikoff | 30/380 |

Primary Examiner—Willie G. Abercrombie
Attorney, Agent, or Firm—Bruce L. Birchard

[57] ABSTRACT

By providing in a carcass saw an enclosure including at least one exhaustible receptacle for bone dust and other waste generated in the course of sectioning a carcass in a slaughter house, contamination of succeeding carcasses by such waste is eliminated.

10 Claims, 5 Drawing Figures

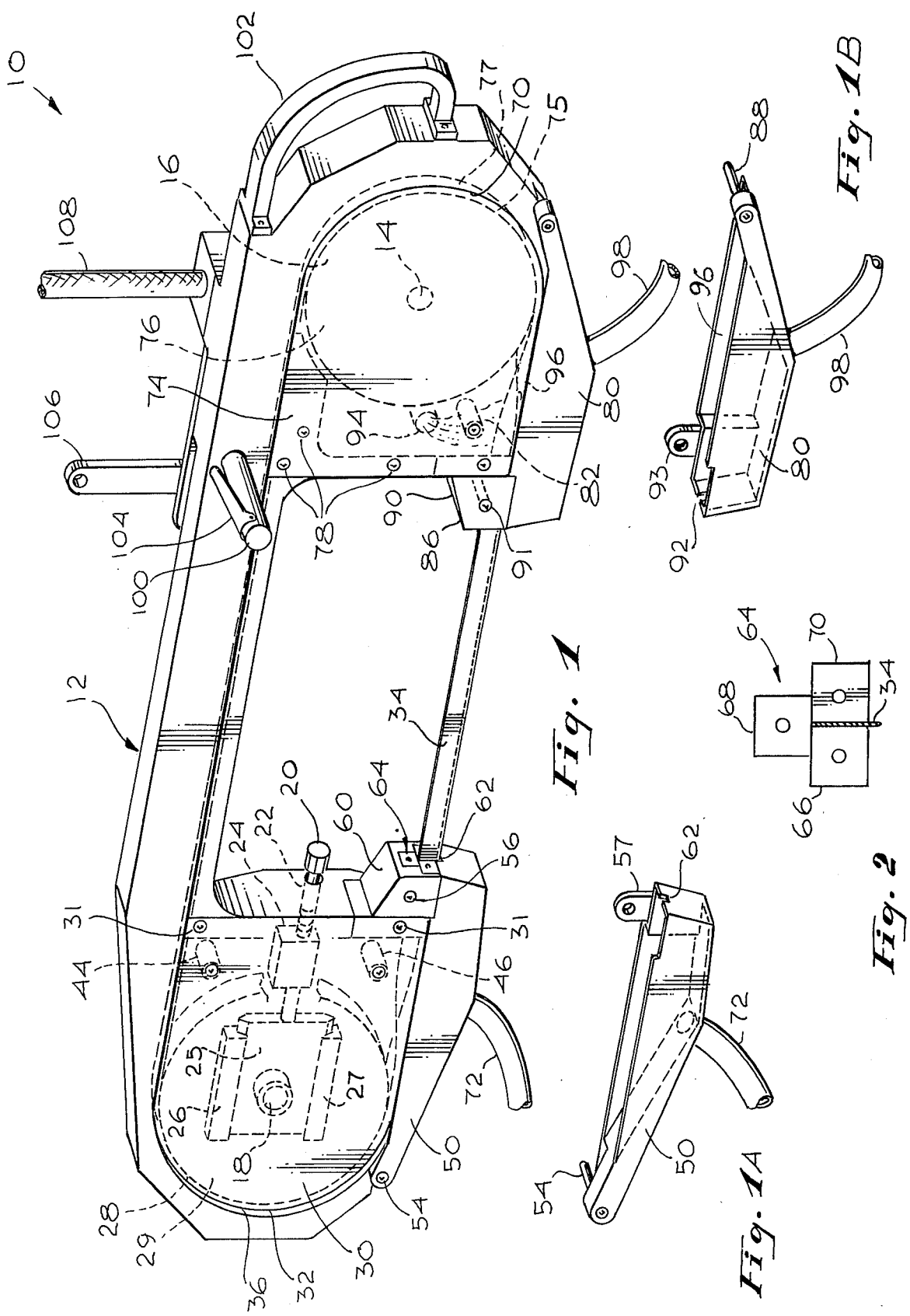

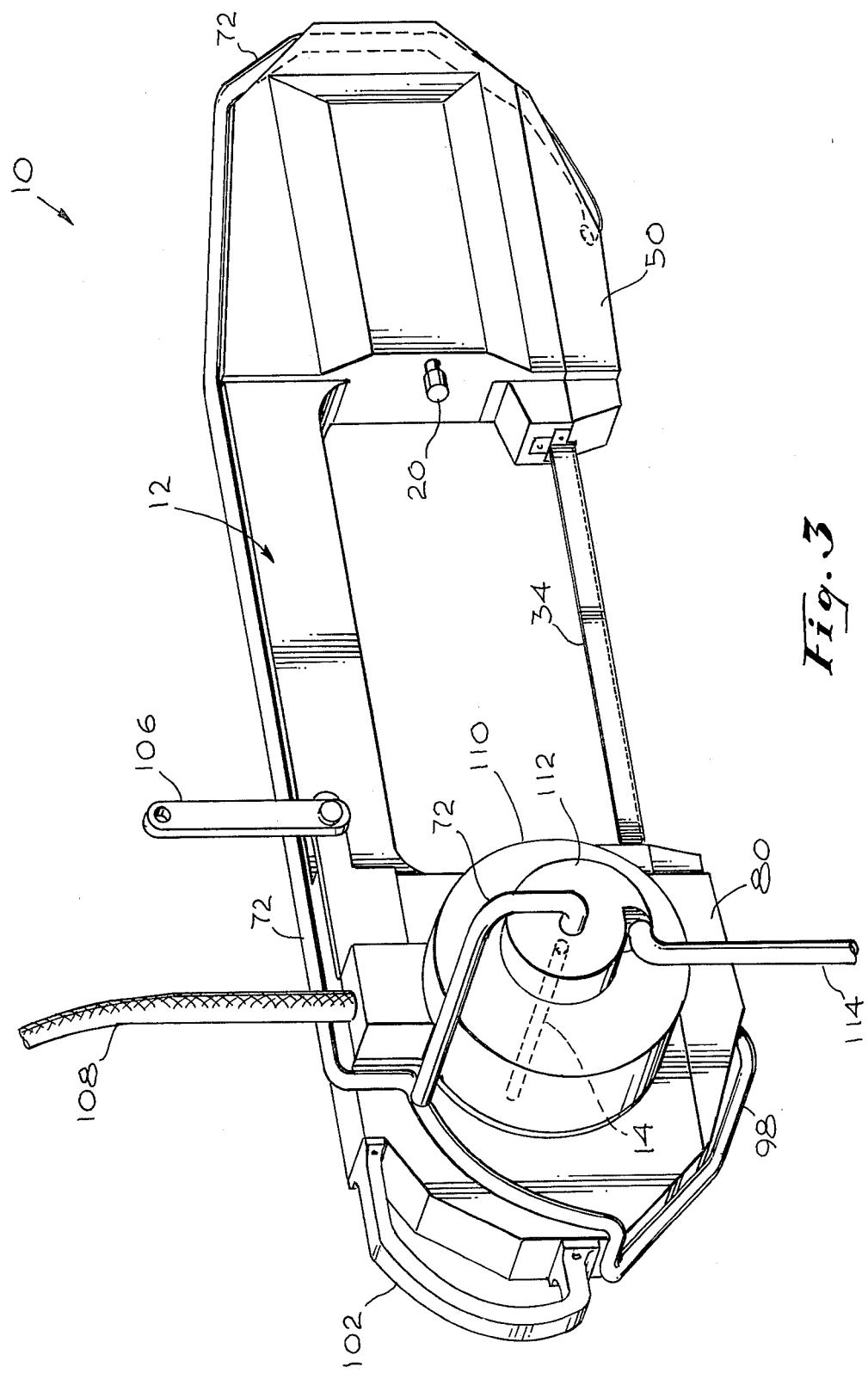

CARCASS SAW

BACKGROUND OF THE INVENTION

1. Field of the Invention

This invention relates to tools for use in slaughter houses and, more particularly, to carcass sectioning saws.

2. Prior Art

In the past band saws have been used in sectioning animal carcasses in slaughter houses. Such band saws have suffered from the problem of bone dust and other debris from one carcass being passed on to another carcass. If one of the carcasses is diseased or deteriorated, successive carcasses may be contaminated and made worthless by such contamination. Such waste material, in the past, has tended to accumulate in the crevices within the saw and no orderly means for preventing such accumulation or removing the bone dust or other waste before it accumulates has been provided. Loss of carcasses arising from contamination can no longer be tolerated in the light of the depressed nature of cattle and meat prices.

Therefore it is an object of this invention to overcome the serious disadvantages set forth hereinbefore.

It is a further object of this invention to provide an improved carcass saw which will have minimized the contamination problem.

SUMMARY OF THE INVENTION

Stated succinctly, by providing reliable, removable enclosures of those portions of the carcass saw which need not be continuously open and having, in conjunction therewith, adequate waste exhaust means for orderly elimination of accumulated waste, contamination of carcasses by waste materials generated in the process of sawing previous carcasses can be prevented.

BRIEF DESCRIPTION OF THE DRAWINGS

The present invention can best be understood by reading the description which follows in the light of the drawings which are provided herewith in which:

FIG. 1 is a elevational view, in perspective, of a carcass saw according to my invention;

FIG. 2 is an elevational view of a portion of the carcass saw of FIG. 1; and

FIG. 3 is a rear elevational view of a modification of the saw of FIG. 1 having additional features.

FIGS. 1A and 2A illustrate the trough details.

DETAILED DESCRIPTION OF THE PREFERRED EMBODIMENT

In FIG. 1, carcass saw 10 includes frame 12 which supports fixed-position axle 14. Axle 14 is driven by a motor, electrical or pneumatic, not shown in FIG. 1. Such motors are well known in the art and need not be described here. Drive rim 16 is supported on and rotates with shaft 14.

Shaft 18 is parallel to shaft 16 and is adjustable towards and away from shaft 18 by means of tensioning knob 20 which is coupled thru threaded pin 22, adjusting block 24 and slide 25 to shaft 18 to adjust the position of shaft 18 in vee-guides 26, 27. Such adjustment of the position of shaft 18 also adjusts the position of rim 28 which is supported on and rotates with shaft 18. Retainer 26 is supported from frame 12 by means, not shown, since they are not significant to my invention.

A cover 30 having in the region 32, a curvature corresponding to the curvature of rim 28 in that region is supported in a covering relationship with the end face 29 of rim 28. Frame 12, in the region 32, has an edge 36 with a curvature similar to that of cover 30 and rim 28 and is spaced from cover 30 by a distance slightly larger than the thickness of saw blade 34 so that in loading blade 34 it may be easily slipped edgewise into the slot formed by edge 36 and the opposing edge of cover 30.

Cover 30 is held in position by means of retaining fasteners or screws 31 and co-operating tapped elements, such as elements 44, 46 which may be integral with frame 12.

It is to be noted that prior art portable carcass bandsaws had doors over the two wheels or discs which carried the blade. When the blade had to be replaced, the doors (which were hinged) had to be opened exposing the moving wheels. After use for a period of time, the latches and hinges associated with such doors became loose and dangerous, for if a door flew open during use of the saw, a worker could be injured. The permanent fixed covers of this invention eliminate that problem, while providing for easy loading through slots, such as that between cover 30 and the opposite edge 36 of frame 12.

Trough 50, which is positioned beneath rim 28, is rotatably supported at one end from frame 12 by hinge 54. At its other end, trough 50 is secured by means of latch 56, through tab 57 to housing 60, which is an extension of frame 12 as can be seen in FIGS. 1 and 1A. Slot 62 permits passage of blade 34 through one end of trough 50 and also provides a stability to the orientation of blade 34. Blade 34 must go thru a 90° twist between its position, lying flat on the driving surface of rim 28 and its cutting position in which it is oriented parallel to the long axis of slot 62. To achieve this rotation, guide block 64 is provided. Guide block 64 may be seen more clearly in FIG. 2.

The bottom of slot 62 provides vertical constraint to blade 34 which passes thru slot 62. In prior art machine removal of the blade from a carcass during cutting to correct a mis-cut often caused blade 34 to be pulled out of guide block 64. When that happened blade 34 tended to snap to the flat position which it assumed in passing over disc 28. The operator then had to stop his work and re-load blade 34 into guide block 64, or its equivalent, a time-consuming procedure.

Guide block 64 comprises a set of metal blocks 66, 68 and 70 of great hardness. For example, blocks 66, 68 and 70 may be made of titanium carbide to assure long life. As has been indicated, guide block 64 is required to rotate blade 34 through 90° between rim 28 and slot 62. It also wipes blade 34 and the debris from such wiping action falls in trough 50 from which it is exhaused through hose 72.

Turning to the fixed rim 16, it is covered, during operation, by cover 74 which is supported over the end face 76 of rim 16 by screws 78 and tapped elements such as element 82. Edge 75 of cover 74 has the same curvature as, and is aligned with, the band saw driving surface 77. Edge 75 is spaced from the opposing edge 70 of frame 12 by a distance slightly greater than the thickness of blade 34, for ease of loading.

Band saw blade 34 is twisted through 90° between guide block 86 and rim 16. The blade 34 is tensioned by adjusting knob 20 after blade 34 has been dropped into place with troughs 50 and 80 open.

Trough 80 is rotatably suspended from pin 88 (FIG. 1B) and, during use, is secured to extension 90 of frame 12 by latch 91 co-operating with tab 93. A slot 92 is provided in trough 80 for the passage of blade 34.

Blade 34 is sprayed with water from spray 94. Slurry thus formed drains through opening 96 into trough 80 and is disposed of through hose 98.

Handles 100 and 102 are provided for manipulating saw 10. Handle 100 may also have trigger 104 for activating the on-off switch or valve for saw 10.

A counterbalance system may be connected to hanger 106.

Electricity or compressed air may be provided through tube 108, depending on whether saw 10 is electrically or pneumatically powered.

The removal of debris or slurry from troughs 50 or 80 may be enhanced by the provision of a pumping system shown schematically in FIG. 3. In FIG. 3, motor 110 is the main motor which runs saw 10 and may be an electrical or pneumatic motor. Its shaft 14 extends not only in the direction to drive disc 16 but, also, in the opposite direction to drive pump 112, which may be a centrifugal pump. Drain lines 72 and 98 from the respective troughs 50 and 80, feed into pump 112 and discharge hose 114 leads to a disposal location. A completely closed waste disposal system is thus provided for saw 10.

Thus, there has been provided an improved carcass saw which is safe to operate, is easy to operate and which is free from the problem of contaminating successive carcasses on which cutting is performed.

While a particular embodiment has been shown and described, it will be apparent to those skilled in the art that variations and modifications may be made therein without departing from the true scope and spirit of the invention. It is the purpose of the appended claims to cover all such variations and modifications.

I claim:

1. An improved carcass saw; including:
    a frame;
    first and second rims spaced from each other and each rotatably supported from said frame;
    a common saw blade carried by both said rims;
    a pair of guide blocks supported from said frame adjacent respective ones of said rims for orienting said blade;
    first cover means supported from said frame and covering said first rim;
    second cover means supported from said frame and covering said second rim; and,
    first and second troughs rotatably supported from said frame beneath said first and second rims, respectively.
2. Apparatus according to claim 1 which includes, in addition, slurry exhaust means connected to each of said first and second troughs.
3. Apparatus according to claim 1 in which the space between said first and second rims is adjustable.
4. Apparatus according to claim 1 which includes, in addition, securing means for fixedly securing said troughs to said frame.
5. Apparatus according to claim 1 in which said covers each has, when in place, an edge conforming in contour to the contour of the rim proximate to it and said frame has an edge opposed to each of said edges of said covers and spaced therefrom by a distance approximating the thickness of said saw blade.
6. Apparatus according to claim 2 in which said slurry exhaust means comprises, in each case, a hose.
7. Apparatus according to claim 1, which includes, in addition, spraying means positioned proximate to said saw blade and between at least one of said rims and its associated guide block.
8. Apparatus according to claim 1 in which each of said troughs has a slot therein for the passage and guidance of said saw blade.
9. Apparatus according to claim 1 in which said frame has openings therethrough proximate to said at least one spray for the passage of slurry to its associated trough.
10. Apparatus according to claim 9 which includes, in addition, pump means coupled to said troughs and having slurry discharge means.

* * * * *